G. W. DICKINSON.
WINDOW.

No. 185,732. Patented Dec. 26, 1876.

WITNESSES
F. L. Durand
C. L. Overt

INVENTOR
Geo. W. Dickinson
Alexander Mason
ATTORNEYS

THE GRAPHIC CO. N.Y.

UNITED STATES PATENT OFFICE.

GEORGE W. DICKINSON, OF CHARLESTON, ILLINOIS.

IMPROVEMENT IN WINDOWS.

Specification forming part of Letters Patent No. 185,732, dated December 26, 1876; application filed August 29, 1876.

*To all whom it may concern:*

Be it known that I, GEORGE W. DICKINSON, of the city of Charleston, in the county of Coles, and in the State of Illinois, have invented certain new and useful Improvements in Window-Sash, making the same of metal, and metal supporting-strips to window and other glasses; and do hereby declare that the following is a full, clear, and exact description thereof, reference being had to the accompanying drawings, and to the letters of reference marked thereon, making a part of this specification.

The nature of my invention consists in a metallic window sash, provided with braces connecting the stiles, and with the single plate of glass cemented to said braces, as will be hereinafter more fully set forth.

In order to enable others skilled in the art to which my invention appertains to make and use the same, I will now proceed to describe its construction and operation, referring to the annexed drawing, in which—

Figure 1:
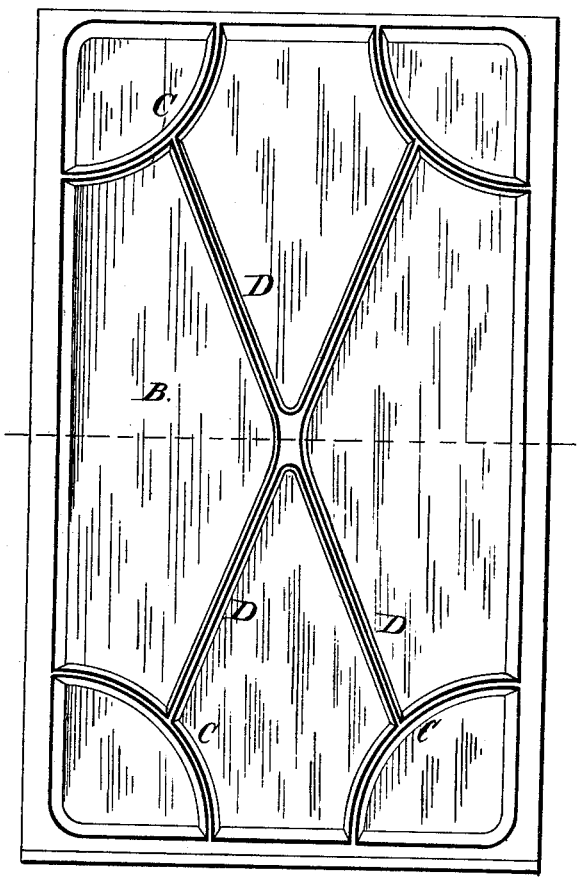
Figure 2:
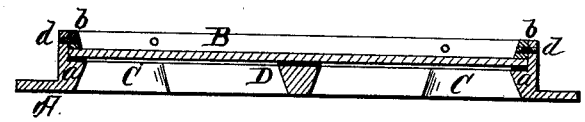

Figure 1 is a front elevation of my invention. Fig. 2 is a cross-section of the same through the line $x\ x$, Fig. 1.

A represents the cast-metal sash-frame, formed on the inner sides with shoulders $a$, upon which the single plate of glass B rests, and is held by means of strips $b\ b$, fastened by means of screws $d\ d$, as shown in Fig. 2. In the sash-frame A are formed curved corner-braces C C, connected by diagonal braces D D; but I do not confine myself to this form of bracing, as the braces may be arranged in any suitable or desired manner. The glass B rests against these braces, and is cemented thereto by the use of putty or other suitable material, as shown.

My invention is intended for use for large show-windows, and other places where a single piece of large glass is employed.

By this means not only is the sash-frame made stronger and more durable, but the glass itself is strengthened and supported to such a degree that, even for large windows single thickness of glass may be used instead of glass double thick, as is now generally employed, thus lessening the expense materially.

I am aware that it is common to disguise ordinary windows by means of Gothic framework, but such is not my invention. The object I have in view is to protect and strengthen large plates of glass by means of suitable metallic braces formed with a metallic frame.

Having thus fully described my invention, what I claim as new, and desire to secure by Letters Patent, is—

The combination, with a single plate of glass, B, of the metallic frame A, provided with braces C D between the bars of the frame, and against one face of the glass plate, as set forth.

In testimony that I claim the foregoing I have hereunto set my hand this 26th day of August, 1876.

GEORGE W. DICKINSON.

Witnesses:
 ISAAC N. VAN DYKE,
 H. C. BAMOND.